United States Patent [19]

Schneider et al.

[11] Patent Number: 4,540,183

[45] Date of Patent: Sep. 10, 1985

[54] LINED GASKET OR SEALING INSERT AND METHOD OF MAKING SAME

[75] Inventors: Walter Schneider, Ketsch; Klaus-Peter Ebert, Gaiberg; Konrad Otto, Schwetzingen, all of Fed. Rep. of Germany

[73] Assignee: Kennecott Corporation, Cleveland, Ohio

[21] Appl. No.: 436,767

[22] Filed: Oct. 26, 1982

[30] Foreign Application Priority Data

Oct. 27, 1981 [DE] Fed. Rep. of Germany ....... 3142535

[51] Int. Cl.³ .............................................. F16J 15/12
[52] U.S. Cl. ........................................ 277/1; 277/226; 277/227; 277/DIG. 6
[58] Field of Search ......... 277/1, 226, 235 B, DIG. 6, 277/227–230, 233; 285/363–368, DIG. 11, DIG. 16

[56] References Cited

U.S. PATENT DOCUMENTS

| 2,050,050 | 8/1936 | Flora | 277/227 X |
|---|---|---|---|
| 2,131,342 | 9/1938 | Baldeschwieler | 277/1 X |
| 2,211,045 | 8/1940 | Balfe | 277/235 B X |
| 3,072,957 | 1/1963 | Blackburn | 277/1 X |
| 3,077,638 | 2/1963 | Hickam | 285/363 X |
| 3,230,290 | 1/1966 | Nelson et al. | 277/1 X |
| 3,258,271 | 6/1966 | Hollingsworth | 277/1 |
| 3,502,149 | 3/1970 | Pence | 277/1 X |
| 3,767,211 | 10/1973 | Amphlett | 277/1 |
| 3,914,843 | 10/1975 | Antonacci | 285/363 X |
| 4,214,444 | 7/1980 | Fujioka et al. | 277/235 B X |

FOREIGN PATENT DOCUMENTS

| 700414 | 12/1964 | Canada | 285/363 |
|---|---|---|---|
| 1161457 | 1/1964 | Fed. Rep. of Germany | 277/1 |
| 2450998 | 5/1975 | Fed. Rep. of Germany | 277/1 |
| 2485677 | 12/1981 | France | 277/1 |

Primary Examiner—Robert S. Ward
Attorney, Agent, or Firm—R. Lawrence Sahr

[57] ABSTRACT

A method for production of lined gaskets or gasket inserts with which a pasty substance is arranged between the sealing surfaces (or correspondingly developed forms) and separated from these by two external layers, and hardened between the form-producing sealing surfaces. The pasty substance preferably contains a filler of quartz powder whose void fraction is filled with a 2-component artificial resin. The pasty substance can be applied with the assistance of a spray gun. A preferred form of construction of such a gasket contains a hardened material layer and a corrugated ring adjoining it, which, along an inner peripheral area are surrounded by a band-shaped shell and are arranged between two gasket insert rings, which for their part are surrounded by a customary shell of polytetrafluoroethylene or such-like. The production of gaskets of this type can take place at the point of use with the aid of simple means, so that costly operational interruptions can be shortened without expensive fitting operations or a re-ordering from a manufacturer being necessary.

10 Claims, 11 Drawing Figures

LINED GASKET OR SEALING INSERT AND METHOD OF MAKING SAME

BACKGROUND AND SUMMARY OF THE INVENTION

The invention concerns a method for production of a lined gasket or a gasket insert for opposing wall surfaces of an enameled glass lined vessel.

It is well-known and frequently the case in the sealing of opposing wall surfaces of metal vessels having enameled or glass lined wall surfaces, such as connecting flanges, that the latter will deviate in surface characteristics due, for example, to the high burn-in temperatures of the steel wall which will warp. In particular, opposing, flanges of lined wall surfaces, to which agitator nozzles are mounted, often are not level. Inasmuch as a slip ring unit, or stuffing box, must be vertically positioned on the vessel, surface differences at the points of connection of the agitator nozzles are equalized or leveled by compensating inserts or gaskets. These equalizing gaskets are also useful in compensating for relatively large burn-in warpages which may occur in these vessels where manhole covers or reactor flanges, with very large diameters, are employed.

A method, proven for decades, for production of lined gaskets for enameled apparatus consists in segment-shaped compensating inserts being placed in the gaskets. These preferably consist of two IT-gaskets, as are well known to those with skill in the field, between which a corrugated ring, usually of a metal, is arranged, the IT-gaskets being surrounded by a shell of polytetrafluoroethylene. Segment-shaped equalizing inserts are fitted by grinding or filing the ends and surfaces, to take up the space between one IT-gasket and the corrugated ring. In instances where the gap caused by the burn warpages is relatively large between the sealing surfaces, several equalizing inserts must be arranged, one over the other in stacked arrangement until the gap is closed. The equalizing inserts usually consist of asbestos-containing materials which are cemented to the corresponding points of the adjacent IT-ring.

In these known methods of the type mentioned, the fitting of the gaskets between warped mounting flanges of the vessel wall and nozzle requires a relatively large expenditure of time; at times several hours are expended in the fitting of the lined gasket between the flange surfaces. In addition, skilled experienced and diligent laborers are necessary since a high degree of accuracy is required. In addition, grinding operations on asbestos-containing materials are injurious to health when the required safety regulations are not carefully maintained. An additional difficulty exists in operation in the fact that the lined gasket settles between the flanges at different rates which are dependent on the thickness of the lining causing leakage over time. Even with very careful original fitting during the fabrication, leakage may occur despite lengthy production operations thereby requiring new fittings. Further, experienced laborers are not always readily available resulting in considerable down-time of the operating apparatus and time-consuming and costly delays in manufacturing procedures.

It is therefore the object of the present invention to provide an improved method of sealing, from that known type previously mentioned, avoiding the many disadvantages and difficulties mentioned in a manner that the fitting operations for the sealing insert can be performed simply and quickly. A further object is to provide a novel resilient lining material for such a gasket insert.

The present invention comprehends the use of a hardening pasty substance which can be applied with relatively low expenditure of energy, for example with a spray gun, a spatula or other familiar application techniques, so that, in contrast to well-known methods, no grinding operations on asbestos-containing materials need be performed. Inasmuch as this method is relatively simple to perform, a fitting can also take place at the point of use without requiring highly skilled labor. The pasty substance should be composed of such materials that the hardened substance has suitable physical properties for the pertinent applicability, especially with regard to settling behavior, spring-back resilience and temperature resistance. A preferred pasty substance of this type has been found to be one that contains a filler of quartz powder whose void fraction is filled by a 2-components artificial resin. Depending on the application, other hardening materials are also usable, and which need not necessarily contain a filler, for example 1- or 2-components plastics or organic cement substances. The addition of a filler, however, enables an adaptation to the required properties during the processing and during operations, for example with regard to viscosity, elasticity, compressive strength, tensile strength, temperature resistance, heat expansion coefficient and pot time. Inorganic materials such as glass, quartz, aluminum oxide or graphite are primarily suited as fillers, which can be added in powder form with suitable granulation, or in fiber form.

DETAILED DESCRIPTION

Figure 1:
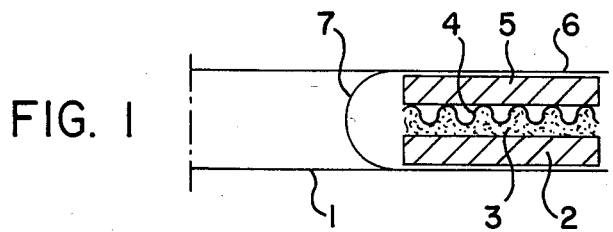
FIG. 1 is a cross-sectional view through a gasket which is produced according to the method of the present invention.

Referring now to the drawings for a more detailed description of the present invention, there is shown in FIG. 1 a form of construction of a gasket that is produced with a method in accordance with the invention. The section 3 lies in an area in which a lining is made with the aid of a pasty substance comprising, for example, a 2-component epoxy resin. The reactive resin components are first mixed with quartz powder in a stirring vessel. The quantity of quartz that is required for a desired amount of ready mixture is predetermined such that the void fraction between the quartz granules is completely filled by resin.

In the production of the gasket identified as No. 4 in the Table (hereinafter set-forth) quartz powder with a granulation 10, was used and for the gasket No. 5, quartz powder with a granulation 00 was used. The quartz portions determined in correspondence to the formula determined above amounted therefore to 45% for the gasket No. 4, and 57% for the gasket No. 5. The required quantity of resin mixture results from the difference of the total quantity and the amount of quartz. The resin is then, in accordance with the formula for the 2-component epoxy resin (for example, 100 parts resin components and 40 part hardener), thoroughly mixed with the necessary amount of hardener. By heating the mixture, a viscosity suitable for application can be achieved, so that the substance can be applied with a spray gun, whose nozzle has, for example, a dimension of 3×25 mm.

As previously mentioned, other compositions of the mixture of the pasty substance with polymers, cross-linked adhesives or similar plastics can also be used, which are adapted to various pertinent applications. The equivalent applies for the filler with regard to particle size distribution and/or composition, so that, for example, ground glass frits, metal carbides, metal and semimetal nitrides, respectively, carbides, ceramic substances or graphite are usable with suitable mixture ratios of filler to artificial resin.

It is the object of the present invention to provide a novel gasket insert to be used, for example, between mating flange surfaces of enameled or glass lined wall surfaces of a metal walled vessel or reactor. To this end the gasket shown in FIG. 1 is adapted for insertion between glass-lined flange surfaces identified by the reference numerals 1 and 6 and is placed on the surface 2 of an enameled flange 1. The pasty substance 3 is then applied to the upper side of the IT-ring 2 by means of a spray gun. Selectively, the application can then take place with either a spatula, spray bag or simple application of preformed components, which contain the artificial resin in microflasks.

Prior to the application of the substance, the distortion between the two sealing flange surfaces 1 and 6 of the vessel are measured, as the height of the application will correspond to the above-described substance and to an additional height of about 2-4 mm. A corrugated ring 4 and an upper IT-ring 5, is then placed on the applied substance. The upper flange 6 is then lowered as a covering flange until the pasty substance is squeezed out at all points of the application. If necessary, the cover is lightly tightened with four bolts (not shown). After this step the cover is then lifted and excessive pasty substance stripped away. The the sealing ring unit 2 and 5 is then surrounded with an outer shell member 7, customarily formed of polytetrafluoroethylene or similar material. The flange 6, is again lowered in order to carry out the hardening of the pasty substance, under exertion of pressure, between the sealing surfaces. In use of a quick-hardening artificial resin or through heat application, 10-20 minutes has been found sufficient for the hardening. After the hardening, the final assembly of the cover takes place.

Figure 2:
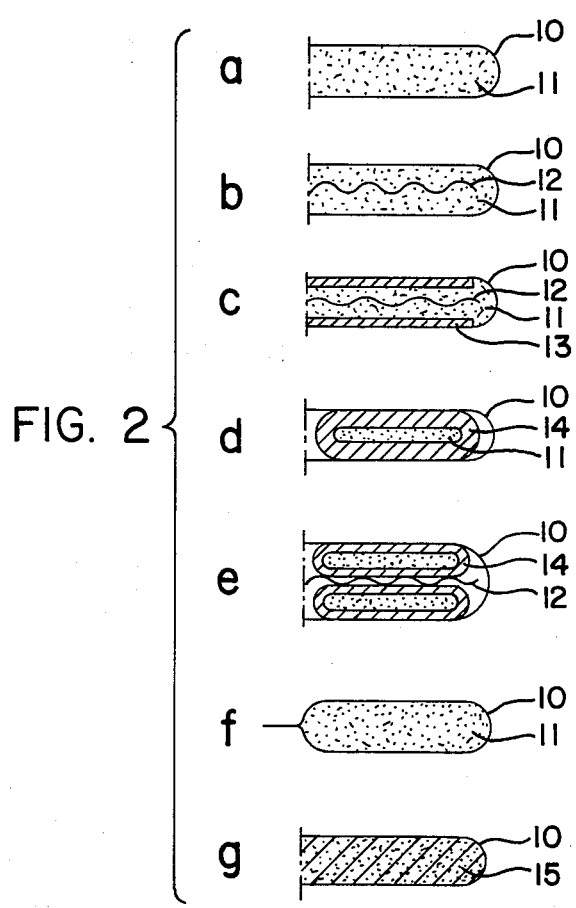
FIG. 2a–2g are views of alternate forms of construction of gaskets which are produced according to the method of the present invention.

Additional alternate embodiments of construction produced in accordance with the method of the present invention are illustrated in FIG. 2.

In FIG. 2a a fabricated gasket is shown which may be fitted between two sealing surfaces which may deviate from parallel planes. This gasket has two outer surfaces formed by an outer shell 10, which surround a pasty substance 11.

In FIGS. 2b and FIG. 2c a corrugated ring 12 is arranged in the pasty substance 11. In the form of construction in FIG. 2c, a lower insert ring 13 and a corresponding upper insert ring is provided. In contrast to the form of construction in FIG. 1, an additional application of the pasty substance 11 is applied over the corrugated ring 12.

In the embodiment of FIG. 2d a hollow IT-ring section 14 is provided filled with the pasty substance 11 within the outer shell 10. Inasmuch as the epoxy resin completely fills section 14 after hardening, a form-exact and dimensionally stable construction will result after the hardening. In FIG. 2e, two hollow IT-ring sections 14 are provided, between which a corrugated ring 12 is inserted. In FIG. 2f a closed outer shell 10 is shown which is filled with the pasty substance 11, and FIG. 2g shows outer shell 10 open on one side, which is filled with a foam-like material 15, which is saturated with the substance of hardenable material.

For this reason, not only a paste-forming or other plastic substance is to be understood as a "pasty" substance in the sense of the invention, but also pre-formed components, which for example are saturated with the components of the artificial resin, or contain these in microflasks.

The forms of construction in FIG. 2 can also be combined with one another, as for example, the form of construction in FIG. 2g with the form of construction in FIG. 2b and 2c. The forms of construction in FIG. 2 can furthermore be used as complete gaskets or as gasket inserts. The manufacture of such gasket inserts is of interest for example, when the materials normally used for the inserts are not suitable, or when gasket dimensions or gasket shapes such as noncircular gaskets are to be produced.

Figure 3:
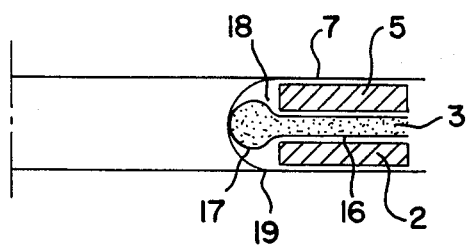
FIG. 3 is a cross-sectional view of a further form of construction of a gasket made in accordance with the present invention.

In FIG. 3 there is shown, in comparison to FIG. 1, a modified form of construction which, as in FIG. 1, comprises an outer shell 7 and two IT-insert rings 2 and 5. In contrast to FIG. 1, an inner shell 16 is arranged between the two IT-insert rings 2 and 5. The inner end 17 of inner shell 16 forms a torus-shaped filling ring filled with pasty substance 3, which at least partially fills the space 18 between the inner surface of the insert rings 2 and 5 and the inner surface portion 19 of the outer shell 6. As is well known, it is expedient, with gaskets having an outer shell 7 consisting of polytetrafluoroethylene, to fill the space 18 defined by the inner shell portion 19, through a filling ring because, otherwise, with internal excess pressure in the reaction vessel, the outer shell lies against the inner surface of the insert rings 2 and 5 will fold, and with internal subpressure in the reaction vessel, the outer shell will then unfold. As a result of this alternating stress, pores and cracks can occur at the folds which considerably reduce the service life of the entire gasket. In comparison to filling rings of familiar type, the advantages of the filling ring in FIG. 3 is the fact that the gasket is simple to produce, as no additional filling ring need be fabricated and installed.

During installation, the gasket of FIG. 3 is first placed on the sealing surface of a flange half, such as done with respect to the gasket of FIG. 1. Then a specific amount of the pasty substance 3 is inserted in the inner shell 16 along the entire periphery thereof. The sealing surface of the second flange is then positioned and the gasket slightly pressed in order for the hardening of the substance to take place. It is then only necessary to remove the excessive quantity of the pasty substance 3 that has overflowed outwardly. This method is especially simple, in that the gasket need no longer be disassembled after the lining. In use of the gasket illustrated in FIG.

1, it is expedient to dismantle the gasket from the vessel after the hardening of the pasty substance in order to remove the pasty substance that overflowed at the inner diameter of the insert rings 2, 5 so that no sharp edges can be formed, which could result in damage to the outer shell 7 by excess pressure from within the vessel. In use of the construction in FIG. 3, if the outer shell 7 is damaged and becomes unusable for any reason, the shell can be readily replaced by a new outer shell as with the form of contruction in FIG. 1.

Figure 4:
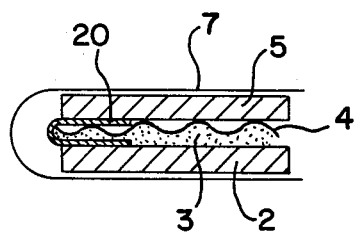
FIG. 4 is a cross-sectional view taken through a preferred form of construction of a gasket in accordance with the invention.
Figure 5:
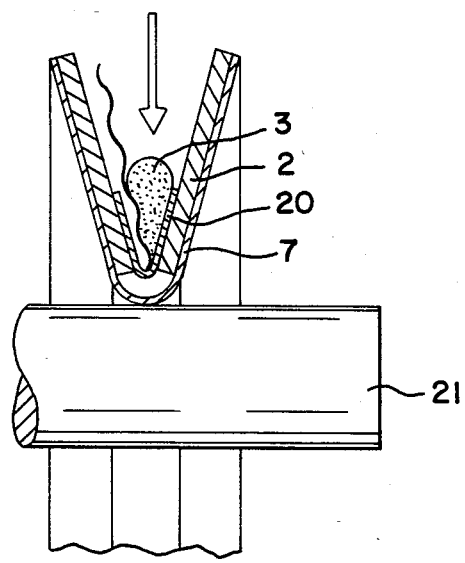
FIG. 5 is a sectional view of a gasket during production of the gasket shown in FIG. 4.

In FIG. 4 there is shown a preferred form of construction of a gasket in accordance with the invention which, as with the forms of construction in FIGS. 1 and 3, is surrounded by an outer shell 7 and, contains two gasket insert rings 2, 5, as well as a corrugated ring 4 arranged over the hardened pasty substance layer 3. In this form of construction, an inner shell 20 is provided which surrounds the hardened material layer 3 and the corrugated ring 4 only in the area of the inner edge. The preferred method for fabrication of this gasket shall be explained in conjunction with FIG. 5. The gasket unit shown in FIG. 5 is, by way of example, pulled vertically over a piece of wood 21, so that the pasty substance 3 can be filled along the outside periphery between the corrugated ring 4 and the gasket insert ring 2, to about the height of the band-shaped inner shell 20. If larger gap spaces between the sealing surfaces are to be bridged, additional pasty substance is inserted in the appropriate gasket area. Preferably, the pasty substance, serving as a lining material, is thoroughly mixed with a hardener in a cartridge, as for example with a spiral agitator arranged on a boring machine, until a homogenous and warm to the touch pasty substance results. The cartridge, provided with a spray nozzle, is then inserted in a compressed air gun so that the pasty substance can be injected in measured quantities in simple fashion. In general, a uniform injection of the substance is sufficient when gaps of only 3 to 4 mm are to be filled. After the injection, the gasket unit is placed on a container flange, and the associated cover is set on and fixed with two retaining bolts (not shown). The retaining bolts are preferably attached at points with slight gaps, and the gasket is formed out by light tightening of the retaining bolts. After the removal of the resin squeezed out at the outer edge of the gasket, the remaining retaining bolts can be final-assembled and lightly tightened. After hardening of the pasty substance, the retaining bolts can be brought to the rated tightening torque.

The Table concerns comparison tests with gaskets No. 1-5. The gasket No. 1 is similar to a well-known gasket design, which consists, as does the gasket in FIG. 1, of two IT-rings 2 and 5, a corrugated ring 4 and a shell 7 of polytetrafluoroethylene, although, in contrast to the present invention, the well-known gasket design has no lining of a hardened pasty substance. Gasket No. 2 also includes a well-known insert of IT-material with a thickness of 2 mm as additionally provided.

The gaskets No. 3–5 correspond to forms of construction in accordance with the invention. The gasket No. 3 contains a lining of hardened epoxy resin, which, however, contains only a relatively small filler additive in the form of fine quartz dust. The gaskets No. 4 and 5 correspond with that form of construction described in conjunction with FIG. 1, with a quartz portion of 45% (granulation 10), respectively a quartz portion of 57% (granulation 00).

The Table further sets forth the settling amounts of these gaskets in dependence of the load reversal number LW at a temperature of 150° C. It can be seen that the amounts of settling of the gaskets 3–5 lined with artificial resin, lie close to one another, while the test results of the gasket No. 2, lined with an additional layer of IT-material are clearly elevated.

The last column of the Table shows the spring-back resilience of these gaskets in dependence of the number of load reversals. All gaskets asymtotically approximate a value which, with a gasket thickness of 9.5 mm, lies at about 0.2 to 0.25 mm.

From a comparison of the test results of the settling amounts, it can be seen that the settling behavior of the well-known gasket No. 1 is practically not influenced by the lining with filled artificial resin according to the form of construction in accordance with the invention. A lining with IT-200 (gasket No. 2) causes, on the other hand, a considerable deterioration of the settling behavior. Gaskets corresponding to the described forms of construction of the invention are therefore more uniform in their settling behavior than gaskets lined with an IT-material. In practice, this means that the amount of settling of gaskets in accordance with the invention is almost independent of the lining thickness.

The number of load reversals after which the settling returns to 0.01 mm/LW is an arbitrarily selected comparison number which enables different types of gaskets to be evaluated with regard to their endurance behavior. The smaller the number of necessary load reversals, the more quickly the final sealing effect is achieved. The best result with the described forms of construction was obtained with gasket No. 5, with which the artificial resin is filled with coarse quartz powder of granulation 00.

TABLE

| No. | Construction | Settling Amount In mm After | | | Settling Amount 0.01 mm/LW | Spring-back Resilience In mm 25 LW |
|---|---|---|---|---|---|---|
| | | 5 LW | 10 LW | 25 LW | | |
| 1. | Teflon shell 2 × insert IT 200 2 mm corrugated ring | 2.468 | 2.520 | 2.579 | 10 | 0.190 |
| 2. | + 1 insert IT 200 mm | 3.275 | 3.353 | 3.440 | 11 | 0.289 |
| 3. | + quartz/resin mixture | 2.418 | 2.480 | 2.543 | 8 | 0.273 |
| 4. | + quartz[1] granulation 10/ resin mixture | 1.940 | 1.995 | 2.051 | 9 | 0.278 |
| 5. | + quartz[2] granulation 00/ | 2.339 | 2.390 | 2.448 | 7 | 0.232 |

TABLE-continued

| No. | Construction | Settling Amount In mm After | | | Settling Amount 0.01 mm/LW | Spring-back Resilience In mm 25 LW |
|---|---|---|---|---|---|---|
| | | 5 LW | 10 LW | 25 LW | | |
| | resin mixture | | | | | |

[1] void fraction of the quartz filled with resin grain size about 40 . . . 63 um
[2] void fraction of the quartz filled with resin grain size about 125 um Although the described forms of construction concern gaskets for connecting nozzles or flanges of enameled apparatus, gaskets of this type are also usable for instance in the fitting of flange connections of pipelines or heat transfer pipes or the like, as well as for the fabrication of noncircular gaskets, gaskets for sealing surfaces inclined to one another, gaskets for equalization of misalignments and such purposes. The use of gaskets of the described type, exemplified by the very-simple-to-produce preferred gasket in FIG. 4, functioning in conjunction with enameled flanges, not only do especially uniform sealing characteristics result at the periphery which are independent of the actual lining thickness, but also bending is eliminated in the enameled flanges during tightening, since the gasket will settle uniformly even with variable lining thicknesses. A rapid settling of the gasket after being set in place is achieved and, even with unfavorable flange geometry or with, for example, an inward opening sealing gap or with slight waviness, a uniform surface pressure is attainable.

What is claimed is:

1. A method of producing a lined sealing gasket for insertion between a pair of opposing enameled wall surfaces of a metal vessel comprising:
   (a) forming an outer shell gasket means
   (b) inserting, within said outer shell, a pair of gasket insert ring members
   (c) arranging said pair of gasket insert ring members within said outer shell, in a spaced apart relationship to each other, such that a face of each of said gasket insert ring members is opposed to a face of the other of said gasket insert ring members in said pair and the inner surface of said outer shell is in contact with the un-opposed faces of said pair of gasket insert ring members
   (d) inserting a band-shaped inner shell means, open only at its outer periphery, between said opposed faces of said pair of gasket insert ring members in such a position that the inner end of said inner shell extends beyond said pair of gasket insert ring members to form a filling ring means while the outer surface portions, of said inner shell means, adjacent to said outer periphery of said inner shell means, are in contact with said opposed faces of said gasket insert ring members.
   (e) interposing an un-hardened pasty substance between said opposed faces of said pair of gasket insert ring means and within said inner shell means,
   (f) placing the assembly, comprising said outer shell gasket means and said pair of gasket insert ring members and said inner shell means, between opposing wall surfaces to be sealed.
   (g) applying a uniform pressure along the sealing surfaces of said assembly to squeeze said pasty substance to form a seal of desired surface dimensions and form; and
   (h) hardening said pasty substance.

2. The invention of claim 1 further comprising inserting a corrugated ring between said opposed faces of said pair of gasket insert ring members and within said inner shell means before said un-hardened pasty substance is interposed therebetween and within and where said assembly further comprises said corrugated ring.

3. The invention of claim 1 further comprising mixing a filler of quartz powder with said un-hardened pasty substance before said un-hardened pasty substance is interposed.

4. The invention of claim 2 further comprising mixing a filler of quartz powder with said un-hardened pasty substance before said un-hardened pasty substance is interposed.

5. A lined gasket comprising:
   (a) a pair of gasket insert ring members, the opposed faces of which are in a spaced-apart relationship to each other;
   (b) a band-shaped inner shell gasket means, open only at its outer periphery, interposed between said opposed faces of said pair of gasket insert ring members, said inner shell gasket means which includes an inner end which extends beyond the said pair of gasket insert ring members to form a filling ring means while the outer surface portions, of said inner shell means, are in contact with said opposed faces of said gasket insert ring members;
   (c) an outer gasket means, portions of the inner surface of which are in contact with substantially the full surface of the un-opposed faces of said pair of gasket insert ring members, which at least partially surrounds said gasket insert ring members, and which completely surrounds said inner end of said inner shell gasket means;
   (d) a hardened pasty substance which substantially fills said filling ring means and that portion of the space between said opposed faces of said pair of gasket insert ring members which is not occupied by said inner shell gasket means.

6. The invention of claim 5 further comprising a corrugated ring means interposed between said opposed faces of said pair of gasket insert ring members, positioned adjacent to one of said opposed faces of said pair of gasket insert ring members and the portion of said inner shell gasket means which is in contact with said one of said opposed faces.

7. The invention of claim 5 wherein said filling ring is torus-shaped.

8. The invention of claim 6 wherein said filling ring is torus-shaped.

9. The invention of claim 5 further comprising a corrugated ring means interposed between said opposed faces of said pair of gasket insert ring members.

10. The invention of claim 9 wherein said filling ring is torus-shaped.

* * * * *